UNITED STATES PATENT OFFICE.

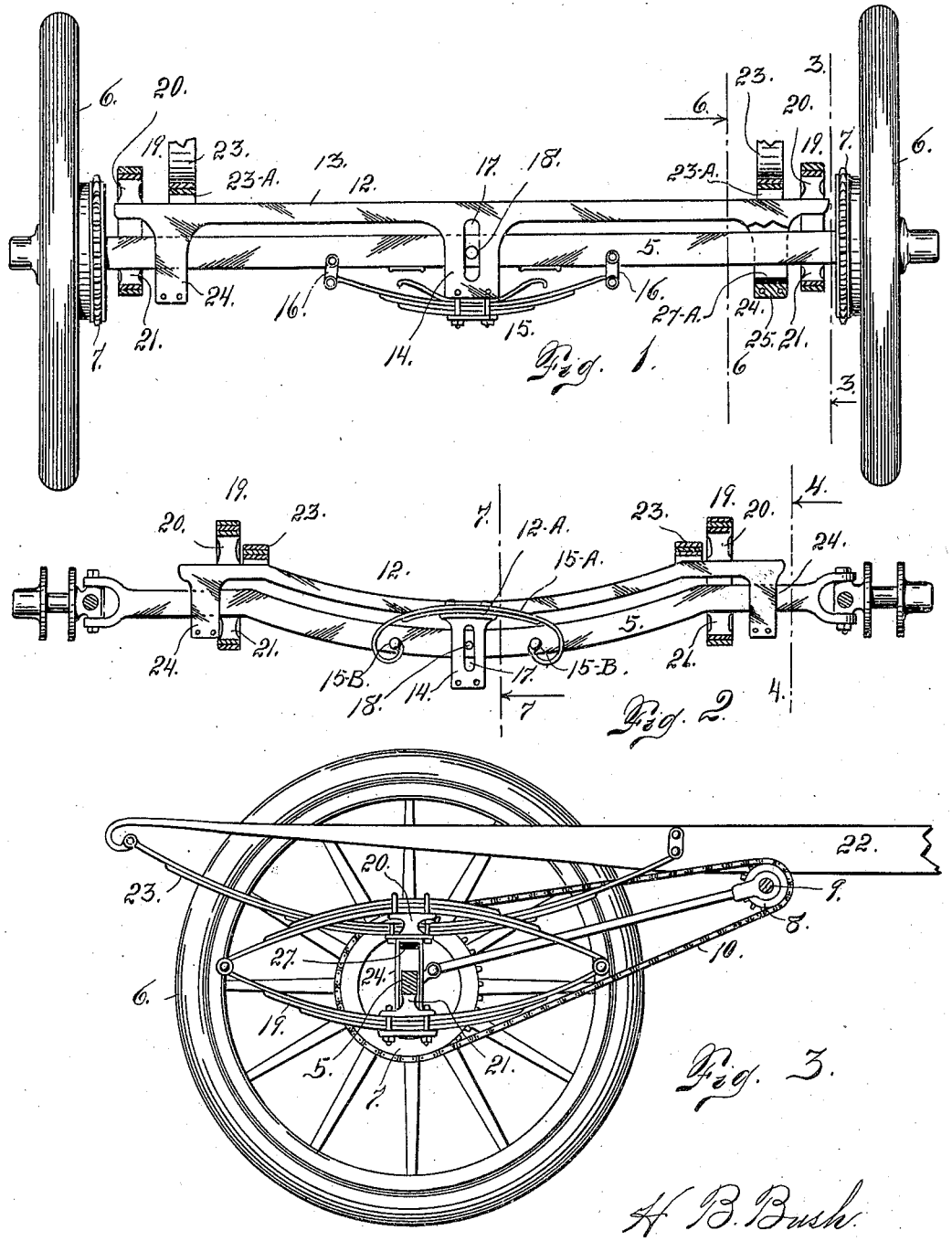

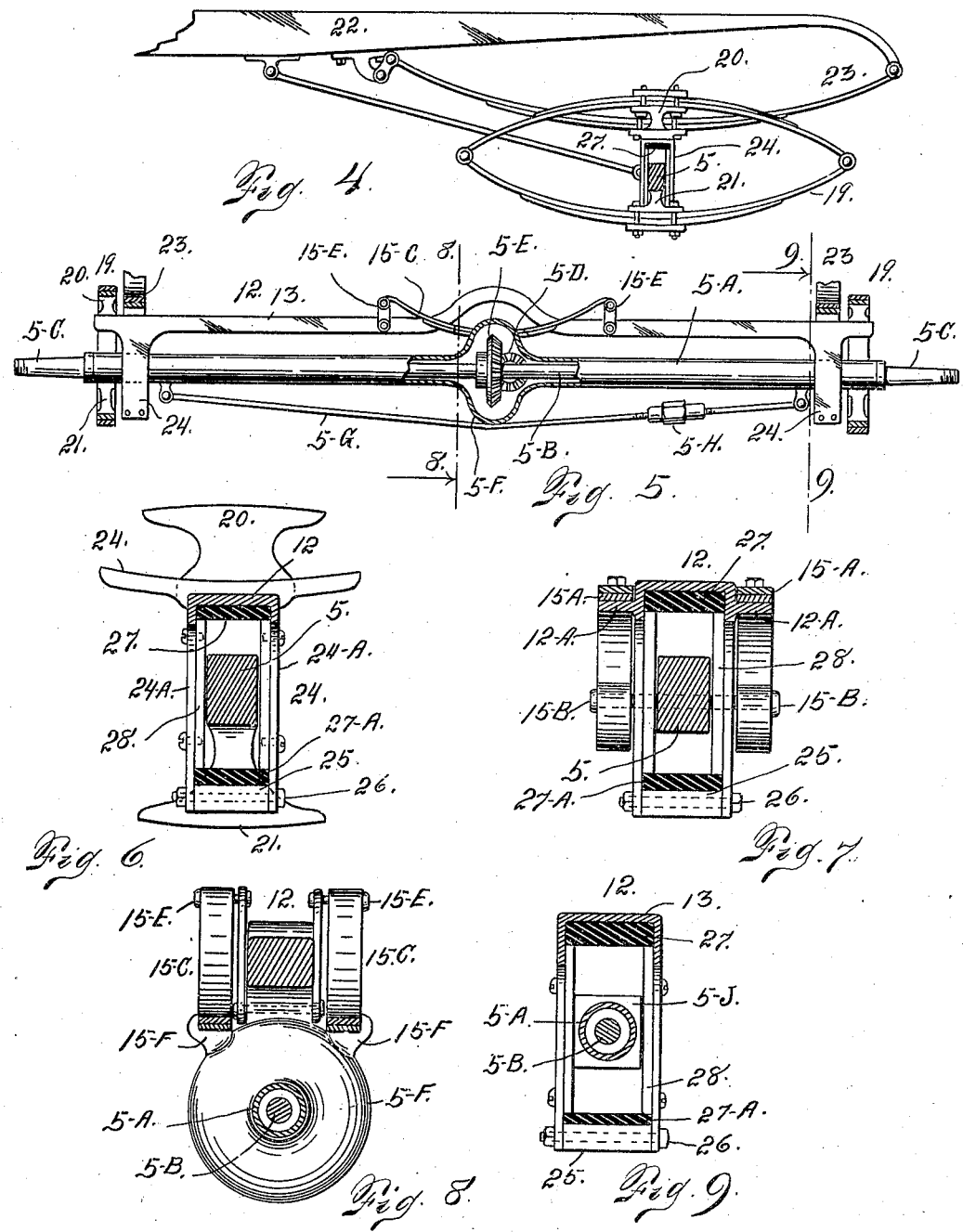

HAZEL B. BUSH, OF LITTLETON, COLORADO.

VEHICLE-AXLE.

No. 903,447.　　　Specification of Letters Patent.　　Patented Nov. 10, 1908.

Application filed June 25, 1906. Serial No. 323,195.

*To all whom it may concern:*

Be it known that I, HAZEL B. BUSH, a citizen of the United States, residing at Littleton, in the county of Arapahoe and State of Colorado, have invented certain new and useful Improvements in Vehicle-Axles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in vehicle axles being more especially intended for use in connection with automobiles and similar vehicles where it is desirable to minimize the vibration.

My object is to provide a construction of this class which shall make it practicable to use a solid tire on vehicles of the class stated, without subjecting the parts of the mechanism to undue concussion or vibration during use.

To this end my improved construction includes what I prefer to call a supplemental axle which is yieldingly connected with the main axle and is allowed vertical movement within reasonable limits, independently of the main axle. The body of the vehicle is supported upon the supplemental axle, and the latter is connected with the main axle in operative relation.

My improved construction applies to both forward and rearward axles and while the construction is substantially the same in both cases, slight modifications are necessarily due to the fact that the main forward and rear axles are of slightly different construction.

Having briefly outlined the invention as well as the function it is intended to perform, I will proceed to describe the same in detail reference being made to the accompanying drawing in which is illustrated an embodiment thereof.

In this drawing, Figure 1 is a view partly in section of my improved axle construction, as applied to the rear axle of an automobile. Fig. 2 is a similar view of the construction as applied to the forward axle. In this view the wheels are omitted. Fig. 3 is a section taken on the line 3—3 Fig. 1, viewed in the direction of the arrow. Fig. 4 is a section taken on the line 4—4 Fig. 2 looking toward the left or in the direction indicated by the arrow. Fig. 5 is a view illustrating a modified form of axle construction for use with automobiles or self propelled vehicles. In this view the construction is shown partly in section. Fig. 6 is a section taken on the line 6—6 Fig. 1 with the parts shown on a larger scale. Fig. 7 is a section taken on the line 7—7 Fig. 2 shown on a larger scale. Figs. 8 and 9 are sections taken on the lines 8—8 and 9—9 respectively, of Fig. 5.

The same reference characters indicate the same parts in all the views.

Let the numeral 5 designate the main axle member whether the forward or rearward construction is considered. While the forward and rear axle constructions are quite different the one from the other, yet so far as my improvement is concerned they are virtually of the same construction and therefore may be designated by the same reference character. Upon the extremities of the axle member 5 are journaled the ground wheels 6 carrying the sprocket wheel 7. In propelling the vehicle the sprocket wheels 7 are connected with sprockets 8 on the driving shaft 9 by suitable chains 10. This is an ordinary construction for propelling the vehicle.

Coöperating with the main member 5, of the axle is an auxiliary or supplemental member 12 whose body portion 13 is mounted directly above the body of the main axle member 5. The body of the supplemental axle is provided with a central depending guide 14 which consists of two members extending downwardly on opposite sides of the main axle member 5, the two members being connected at the bottom. By virtue of this construction the guide 14 taken in connection with the body of the supplemental member, completely surrounds the axle member 5. To the lower extremity of the depending guide is secured the central portion of a half elliptical spring 15 whose extremities are connected to the axle member 5 as shown at 16. The parts of the guide 14 on opposite sides of the axle member 5 are slotted as shown at 17 to receive pins or lugs 18 connected with the member 5. The body of the supplemental axle part normally occupies a position sufficiently above the member 5, to permit considerable vertical movement without striking the latter. The axle member 12 is further supported above the member 5, by an elliptical spring 19 located at each extremity of the axle. The central upper portions of the elliptical springs 19 engage blocks 20 resting on the opposite extremities of the supplemental axle; while the central lower portions of these springs 19, are connected with blocks 21 secured to the axle member 5.

The body of the vehicle which may be designated 22, is provided with a half elliptical spring 23, whose central portion bears upon the axle member 12 as shown at $23^A$. There is one of these supporting springs 23 at each extremity of the axle. The supplemental axle member is also provided at its extremities with depending guides 24 having side members $24^A$ located on opposite sides of the main member 5. The lower extremities of these side members are separated by a spacer 25 through which is passed a connecting bolt 26. The body portion of the supplemental axle is preferably channeled as best illustrated in Figs. 6, 7 and 9. This channeled portion of the axle is provided interiorly with a rubber or other yielding cushion or buffer 27, while in the bottom of each guide is located a similar cushion or buffer $27^A$. The function of these buffers is to relieve the concussion or jar in case the two axle members should come in contact at either the upper or lower surface of the main axle member. Each guide is provided on its inner surface with vertically disposed wearing plates 28 which are removably connected with the body of the guide and may be readily detached when it becomes necessary to replace them by new plates.

The construction for the forward and rear axles as heretofore stated, is substantially the same. The central construction is composed of two members $15^A$ one located on each side of the axle members. The central portion of each of these spring members is bolted to lateral flanges $12^A$ formed integral with the body of the supplemental axle; while the extremities of these spring members are connected with the axle member 5 as shown at $15^B$.

In the form of construction shown in Figs. 5, 8 and 9, a modified form of rear axle is shown. In this case the main axle member is composed of an outer stationary hollow member $5^A$ through which passes a revoluble member $5^B$ to the outer extremities $5^C$ of which the ground wheels (not shown) are attached. The revoluble member $5^B$ is suitably connected with a source of power (not shown) by gears $5^D$ and $5^E$. In this case the central half elliptical spring is composed of two members $15^C$ located on opposite sides of the supplemental axle member 12. The extremities of the spring members $15^C$ are connected with the axle member 12 as shown at $15^E$, while their central portions engage lugs $15^F$ formed on the enlarged central part $5^F$ of the axle part $5^A$. The springs 19 and 23, in this form of construction are connected in substantially the same way as heretofore described when speaking of the other forms of construction. The extremities of the hollow axle part $5^A$ are connected by a tie rod $5^G$ provided with a turn buckle for purposes of adjustment.

From the foregoing description the use and operation of my improved device will be readily understood and need not be described further in detail. The operation of the moving parts of the vehicle, that is to say the running gear, is substantially the same as any other constructions, the only difference being that the body of the vehicle and the load are supported directly upon the supplemental axle members thus relieving the vibration which otherwise would result from the use of the vehicle, and making it practicable to use solid or cushion tires as distinguished from the pneumatic tires in machines of this class.

In the form of construction shown in Figs. 5, 8 and 9, the hollow axle part $5^A$ is provided with a part $5^J$ shaped to fit the wearing plates of the depending guides, this part $5^J$ being preferably rectangular in shape and in any event being provided with parallel vertical surfaces adjacent the wearing plates 28.

In my improved construction it is believed to be essential that the end springs 19 be of less strength or somewhat weaker than the end springs 23 upon which the body of the vehicle rests. In other words in the use of a vehicle it hardly ever happens that both ground wheels on either axle enter an unusual depression on the road at the same instant. On this account the springs at the opposite ends of the axle are not subjected simultaneously to the same strain. Hence by virtue of my construction whereby each spring 19 is somewhat weaker than the adjacent spring 23, the yielding capacity of the spring 19 when the ground wheel on that side enters an unusual depression, will be first exhausted, after which the spring 23 will receive the strain and yield accordingly. This construction and arrangement makes it necessary to employ the central spring construction 15, $15^A$ or $15^C$ as the case may be. In other words it is believed important that the two end springs 19 and the central spring 15 or the two spring members $15^A$ or $15^C$ as the case may be, combined shall be equal in strength to the two springs 23. Hence by employing the central spring construction, it becomes practicable to make the end springs 19 of less strength than the end springs 23. The springs 23 should be sufficient to support the load when the vehicle is at rest, and this is true also of the three springs 19, 19 and 15. In case of a sudden jolt on either side of the vehicle, the spring 19 on that side will yield to relieve the concussion or jar. When the vehicle is at rest, however, or when running on a perfectly smooth track, theoretically there should be no vibration or approximately no vibration of the springs. The springs, however, are brought into requisition to obviate or overcome jar or concussion incident to the unevenness of the road. Therefore under normal conditions in order that the supplemental axle member 12 shall occupy a position above the main axle member 5, it is necessary that the springs 19, 19 and 15 shall be sufficient to support the load, thus preventing the supplemental axle 12 from settling down upon the main axle member, in which event there would of course be no advantage in the supplemental axle construction since the two members would be virtually a single integral member.

Having thus described my invention, what I claim is:

1. In a vehicle, the combination with the body of the vehicle, of a main axle member and an auxiliary axle member, the body of the vehicle being supported upon the latter, and the two axle members being yieldingly connected whereby the auxiliary member has a limited degree of independent vertical movement, and the auxiliary axle construction also being provided with buffers located both above and below the main axle member.

2. A vehicle axle composed of a main axle member, and an auxiliary or supplemental axle member yieldingly connected with the main axle member to permit a limited degree of vertical movement, the auxiliary axle member being provided with depending guides through which the main axle member passes and buffers located both above and below the main axle member for the purpose set forth.

3. A vehicle axle composed of a main member and a supplemental member, springs connected with the two members on opposite sides of the center of the vehicle, other springs on opposite sides of the center of the axle resting upon the supplemental member and interposed between the latter and the body of the vehicle, the last named springs being of greater strength than the first named springs, and a central spring connected with the two axle members and coöperating with the first named springs, to make the entire spring construction connecting the two axle members, equal or approximately equal to the springs bearing upon the supplemental axle member and interposed between the said member and the body of the vehicle.

4. A vehicle axle composed of two members, three springs connecting the two axle members and holding them in separated relation, one spring being centrally located and the other springs being located on opposite sides of the center, and two other springs engaging the supplemental axle member on opposite sides of the center and interposed between the supplemental member and the load, the last named springs being of greater strength than the two end springs connecting the two axle members.

In testimony whereof I affix my signature in presence of two witnesses.

HAZEL B. BUSH.

Witnesses:
 DENA NELSON,
 A. J. O'BRIEN.